United States Patent Office 3,335,167
Patented Aug. 8, 1967

3,335,167
β-CYANOALLYLOXYBENZENE SULFONIC ACID AND ALKALI METAL SALTS THEREOF
James C. Masson, Chapel Hill, N.C., assignor to Monsanto Company, St. Louis, Mo., a corporation of Delaware
No Drawing. Filed July 30, 1964, Ser. No. 386,409
3 Claims. (Cl. 260—465)

ABSTRACT OF THE DISCLOSURE

β-Cyanoallyloxybenzene sulfonic acid and alkali metal salts thereof have been synthesized and found useful as monomers in forming basic dyeable acrylonitrile polymers. The novel compounds have been synthesized by reaction of β-cyanoallyl halides with phenol sulfonic acids in the presence of a base in an aqueous or aqueous acetone medium.

This invention relates to novel compositions of matter and to processes for their preparation.

Compounds containing sulfonate groups which are co-polymerizable with other compounds are useful for improving the basic dyeability of acrylic polymers. The dyeability of acrylonitrile polymers has in the past been improved by copolymerizing acrylonitrile with monomers of various sulfonated aromatic compounds. The selection of a suitable monomer to modify a particular property of a polymer must include consideration not only of the efficacy with which the particular monomer modifies a desirable property of the polymer, but also how the monomer adversely effects other polymer properties. Polymers so modified can be used alone or blended with other polymers to provide improved basic dyeability for polymers or blends useful in the production of fibers, filaments and films.

Accordingly, it is an object of the present invention to provide new compositions of matter containing basic dye receptive sulfoxy groups. The compounds are used as comonomers. They may be incorporated in small quantities in the polymer molecules to enhance the basic dye acceptance of the polymers.

It is another object of this invention to provide a process for the preparation of β-cyanoallyloxybenzene-sulfonic acid and its alkali metal salts.

Other objects and advantages derived from this invention will become apparent from the ensuing description.

The reaction involved in the process of this invention may be represented as follows:

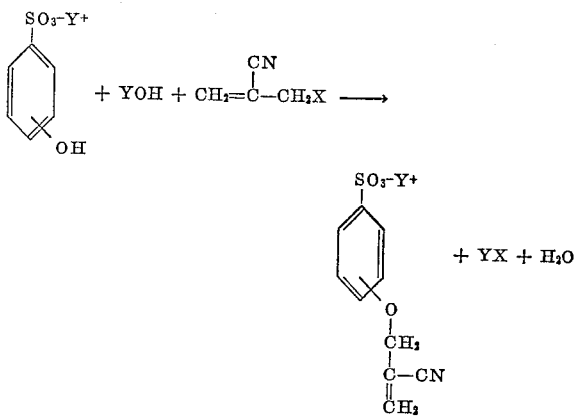

wherein X is a halogen atom and may be chloro, bromo or iodo and Y represents an alkali metal, such as lithium, cesium, sodium, potassium or rubidium. The free acid wherein Y is hydrogen may be liberated by passing a solution of the salt through a conventional cation exchange resin in the hydrogen form. In this synthesis a slurry of a water soluble alkali metal salt of a phenol sulfonic acid is prepared in water at room temperature. The phenol sulfonic acid slurry is stirred to form a solution to which is added a β-cyanoallyl halide, the addition taking place at room temperature. A slight excess of β-cyanoallyl halide, based on the phenol sulfonic acid, should be used to insure completeness of the reaction. The mixture of the reactants is then heated with vigorous stirring at reflux temperature. An aqueous solution of a base is added incrementally during the time in which the reaction mixture is held at reflux to maintain the pH near neutrality or very slightly basic. The added base is preferably an alkali metal hydroxide, such as sodium or potassium. Other bases such as the alkaline earth metal hydroxides or ammonium hydroxide may be used. The reaction takes place at the liquid interface. The more vigorously the reaction mixture is stirred, the better and faster the reaction occurs because of an increased interface area. The ether product as formed is relatively insoluble in the reaction mixture and settles out or precipitates as the reaction proceeds. The product is easily recovered and may be separated and dried by any convenient means such as by filtration or by vacuum distillation of the water and acetone, is present. The resulting compounds are quite free from impurity, there being very little unreacted phenol sulfonate being present. Yields of 70–85 percent are very readily obtained by this method. Although the free phenol sulfonic acid can be used in the reaction, the use of an alkali metal salt of the phenol sulfonic acid represents the preferred embodiment of the process since the use of the free acid necessitates an addition of larger amounts of base during the course of reaction.

The reaction medium may be water or acetone or a mixture of the two. In either case, a two-phase system results, the β-cyanoallyl halide being insoluble in water and the acetone being practically immiscible with the aqueous solution of the phenol sulfonate. When water alone is used as a reaction medium the alkali metal β-cyanoallyloxybenzenesulfonate precipitates as it is formed. Where vigorous agitation of the reaction mixtures is impractical, acetone or a similar solvent may be employed as a solvent for the halide. Aqueous acetone is a better solvent for the β-cyanoallyl halide than water alone and increases the rate of reaction. However, with vigorous agitation the acetone is unnecessary and water alone may be used as the reaction medium. Improved yields may also be brought about by the use of a small stoichiometric excess, up to about 5 percent, of base. Moreover, a slight stoichiometric excess of the β-cyano-allyl halide has been noted to increase the yield. When water alone is used in the absence of another solvent the unreacted allyl halide may easily be recovered for recycle by distillation.

The reaction time depends on the scale of the reaction, the efficiency of the agitation and the solvent action. Completion of the reaction may be detected in an aqueous acetone system as the point at which the second phase practically disappears and the solution becomes clear. In the case where water is used alone as the reaction medium, periodic distilling off and measuring the unreacted allyl halide may be used as a means to determine the degree of reaction completion. When the aqueous acetone system is used acetone must be distilled from the product to lower the solubility of the product enough for good recovery. Alkali metal β-cyanoallyloxybenzene-sulfonates are much less soluble in alkali metal chloride solution than in water alone. Accordingly, the presence of alkali metal chlorides in the reaction mixture aids in the isolation of a product. The first crystallization crop which is isolated with a single water wash has been found to be of relatively high purity as evidenced by a negative test for either chloride ion or phenol. Alkali metal analysis agrees very well with that theoretically determined. As above indicated β-cyanoallyloxybenzenesulfonic acid may be isolated by use of conventional cationic exchange resins in the hydrogen-form.

The alkali metal salts of β-cyanoallyloxybenzenesulfonic acid of this invention can be widely used as basic dye acceptors in acrylonitrile polymers by incorporation of generally less than about 10 percent of the compounds in the polymerization mixture. For example, the basic dye acceptability of an acrylonitrile/vinyl acetate copolymer prepared in a redox system is increased over 50 percent by incorporation of about 1 percent by weight of sodium β-cyanoallyloxybenzenesulfonate in the polymer chain. No adverse effects are observed in the other polymer properties.

In order to further illustrate the present invention and advantages thereof, the following specific example is given. However, the invention is not intended to be limited to the specific embodiment. In the example all parts and percents are by weight unless otherwise indicated.

Example 58.1 grams (0.25 mol) of the sodium p-phenolsulfonate dihydrate was dissolved in 70 ml. of water to which was added 110 ml. of acetone in a flask equipped with a stirrer, addition funnel, and a reflux condenser. To the salt solution and acetone in the flask 28.9 g. (0.285 mol) of β-cyanoallyl chloride was added and the mixture was then refluxed. Over a period of about 90 minutes at reflux a solution of 10 g. of sodium hydroxide and 40 ml. of water was added to the reaction mixture to maintain the pH at about 8. The mixture was then refluxed an additional 2 hours after which the acetone was evaporated and the precipitated crystals were collected. A 73 percent yield of the β-cyanoallyloxybenzenesulfonate was obtained after recrystallization from aqueous ethanol. Elemental analysis of an S-benzylthiuronium salt of this product melting at 150° C. was made. The theoretical values calculated for the formula: $C_{18}H_{19}O_4N_3S_2$ were C, 53.31; H, 4.72; N, 10.36 and found C, 53.32; H, 4.97; N, 10.17.

It will be understood by those skilled in the art that different embodiments of this invention can be made without departing from the spirit and scope thereof. Accordingly, it is intended that this invention is not to be limited to specific embodiments thereof except as defined in the appended claims.

I claim:
1. A compound having the formula

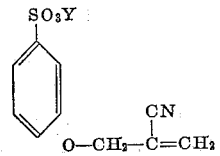

wherein Y is a cation selected from the group consisting of a hydrogen ion and an alkali metal ion.
2. β-Cyanoallyloxybenzenesulfonic acid.
3. Sodium β-cyanoallyloxybenzenesulfonate.

References Cited

Kothyarevskii et al., "Chemical Abstracts," vol. 51, pp. 14593–14594 (1957).

CHARLES B. PARKER, *Primary Examiner.*
DOLPH TORRENCE, *Assistant Examiner.*